(12) United States Patent  (10) Patent No.: US 9,048,889 B1
Vijayaraghavan et al.  (45) Date of Patent: Jun. 2, 2015

(54) HIGH-SPEED DATA COMMUNICATIONS ARCHITECTURE

(71) Applicant: Altera Corporation, San Jose, CA (US)

(72) Inventors: Divya Vijayaraghavan, Los Altos, CA (US); David W. Mendel, Sunnyvale, CA (US); Gregg William Baeckler, San Jose, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/075,861

(22) Filed: Nov. 8, 2013

(51) Int. Cl.
*H04L 27/00* (2006.01)
*H04B 1/04* (2006.01)
*H04B 1/16* (2006.01)

(52) U.S. Cl.
CPC ... *H04B 1/04* (2013.01); *H04B 1/16* (2013.01)

(58) Field of Classification Search
CPC .................................... H04B 1/04; H04B 1/16
USPC .......... 375/295, 146, 316, 219; 370/235, 474, 370/476, 540; 714/755, 807
See application file for complete search history.

(56) References Cited

U.S. PATENT DOCUMENTS

2010/0215086 A1* 8/2010 Vijayaraghavan et al. ... 375/219
2013/0083810 A1 4/2013 Ghiasi et al.

OTHER PUBLICATIONS

"PBL model update",by Trey Malpass, IEEE 2007.*
David Law and John D'Ambrosia, IEEE P802.3ba: Architecture Overview, IEEE 802.3 Time Synchronization Protocol Study Group—May 2009 Interim, Version 1.0, pp. 1-13.
100GE and 40GE PCS Overview, IEEE 802.3az, Nov. 2008, pp. 1-27, Dallas, TX.

* cited by examiner

*Primary Examiner* — Dhaval Patel
(74) *Attorney, Agent, or Firm* — Okamoto & Benedicto LLP

(57) ABSTRACT

The present disclosure provides physical coding sublayer architectures that enable high-speed serial interfaces capable of operating at data rates ranging from 400 gigabits per second (Gbps) to 1 terabit per second (Tbps). A first embodiment relates to an architecture that provides an aggregated physical coding sublayer (PCS) that provides multiple virtual lanes. A second embodiment relates to an architecture that has a channel-based PCS and provides an aggregation layer above the PCS channels. A third embodiment relates to an architecture that, like the second embodiment, has a channel-based PCS and provides an aggregation layer above the PCS channels. However, each channel-based PCS in the third embodiment provides multiple virtual lanes. Other embodiments, aspects and features are also disclosed.

24 Claims, 14 Drawing Sheets

HIGH-SPEED DATA COMMUNICATIONS ARCHITECTURE

BACKGROUND

1. Technical Field

The present invention relates generally to data communications. More particularly, the present invention relates to circuitry for high-speed data links.

2. Description of the Background Art

High-speed data links are used to communicate data between devices in a system. Serial interface protocols have been developed at increasingly fast data rates for such high-speed data links.

SUMMARY

The present disclosure provides physical coding sublayer architectures that enable high-speed serial interfaces capable of operating at data rates ranging from 400 gigabits per second (Gbps) to 1 terabit per second (Tbps). A first embodiment relates to an architecture that provides an aggregated physical coding sublayer (PCS) that provides multiple virtual lanes. A second embodiment relates to an architecture that has a channel-based PCS and provides an aggregation layer above the PCS channels. A third embodiment relates to an architecture that, like the second embodiment, has a channel-based PCS and provides an aggregation layer above the PCS channels. However, each channel-based PCS in the third embodiment provides multiple virtual lanes.

Other embodiments, aspects and features are also disclosed.

DETAILED DESCRIPTION

Existing protocol stacks for high-speed serial interfaces are inadequate to support data rates at or above 400 gigabits per second (400 Gbps). As a result, it is highly desirable to provide new architectures for a protocol stack to support such high-speeds.

Figure 1:
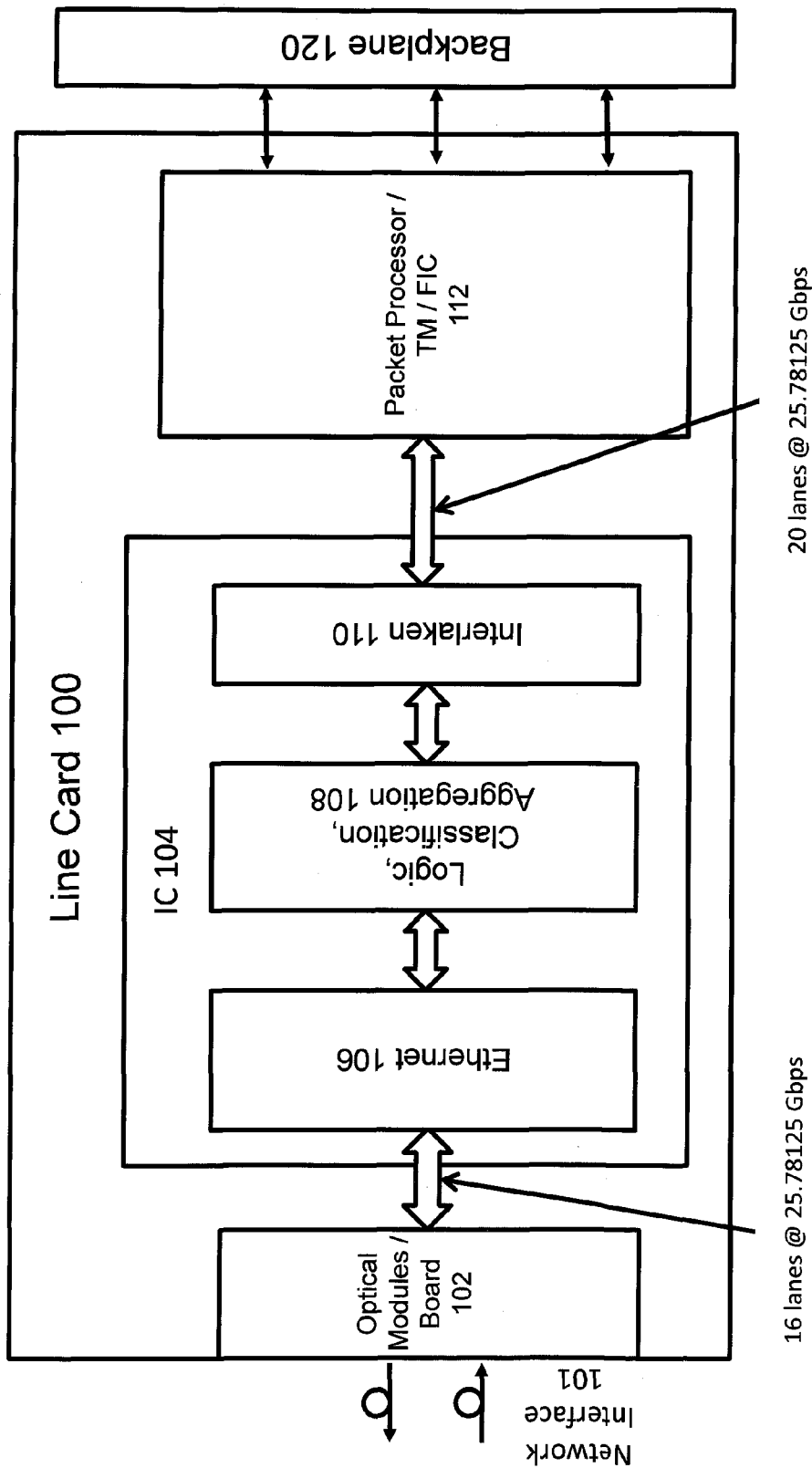
FIG. 1 depicts an exemplary implementation of a line card for a network interface in accordance with an embodiment of the invention.

FIG. 1 depicts an exemplary implementation of a line card 100 for a network interface in accordance with an embodiment of the invention. As depicted, the line card 100 interconnects a system backplane 120 to a network interface 101. The line card 100 may include: optical modules/board 102; an integrated circuit 104; and a packet processor 112. The integrated circuit 104 may include: an Ethernet circuit module 106; a logic, classification and aggregation circuit module 108; and Interlaken circuit module 110. The packet processor 112 may include a traffic manager (TM) module and a fabric interface controller (FIC) module. In one embodiment, the integrated circuit 104 may be implemented using a field programmable gate array (FPGA).

The packet processor 112 may be interconnected with the Interlaken circuit module 110 by a first multi-lane interface. For example, as shown, the first multi-lane interface may include 20 lanes, each lane operating at a data rate of 25.78125 gigabits per second (Gbps). The Ethernet circuit module 106 may be interconnected with the optical modules/board 102 by a second multi-lane interface. As shown, the second multi-lane interface may include 16 lanes, each lane operating at 25.78125 Gbps. Together, the 16 lanes provide a data rate of 400 Gbps.

Figure 2:
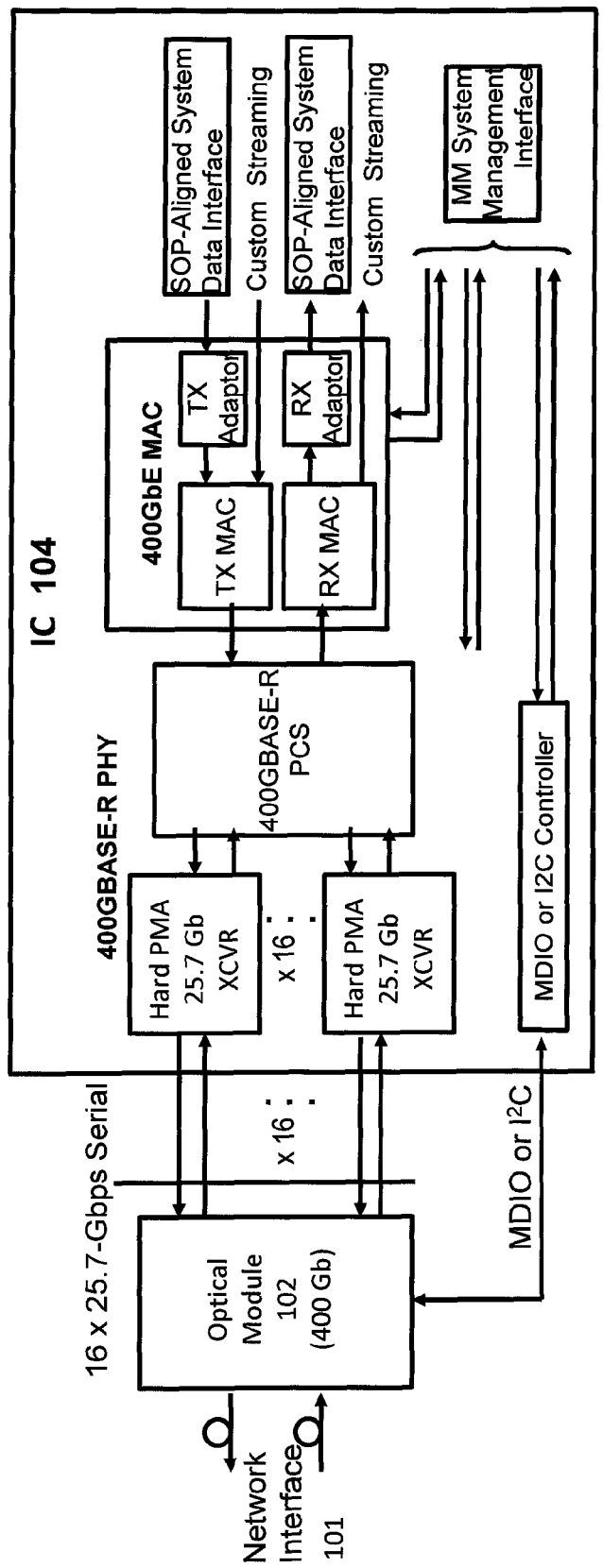
FIG. 2 depicts an exemplary implementation of an integrated circuit for the line card in accordance with an embodiment of the invention.

FIG. 2 depicts an exemplary implementation of an integrated circuit 104 for the line card 100 in accordance with an embodiment of the invention. In the exemplary implementation shown in FIG. 2, the IC 104 may communicatively connect to the optical module 102 by way of sixteen bi-directional serial communication links. Each link may have a data rate of 25.78125 Gbps in each direction, for example.

Each bi-directional serial link may communicatively connect to a hard-wired physical media access (PMA) transceiver (XCVR) module. Each PMA XCVR module may serialize data for transmission over the link at a data rate and also de-serialize data received from the link at the same data rate. In an exemplary implementation, the data rate may be 25.78125 Gbps.

The multiple PMA XCVR modules may interconnect with physical coding sublayer (PCS) circuitry. As shown in FIG. 2, the PCS circuitry may be implemented in a PCS circuit module. In an exemplary implementation, the PCS circuit module may have a data rate of 400 Gbps. As described further below, the PCS circuit module may be structured to provide an aggregated PCS circuit or multiple channel-based PCS circuits.

The PCS circuitry may interface with media access control (MAC) circuitry. In an exemplary implementation, the MAC circuitry may have a data rate of 400 Gbps. The MAC circuitry may include transmit (TX) MAC and receive (RX) MAC circuit modules.

The TX MAC circuit module may receive the data to be transmitted (i.e. transmit data or TX data) from one of multiple sources in the IC 104. In the exemplary implementation depicted, the TX MAC circuit module may be configured to receive TX data from either a start-of-packet (SOP) aligned system data interface or a custom streaming interface. A TX adaptor module may be used to adapt the data from the SOP-aligned system data interface to a format suitable for the TX MAC circuit module.

The RX MAC circuit module may provide the data that is received (i.e. receive data or RX data) to one of multiple destinations in the IC 104. In the exemplary implementation depicted, the RX MAC circuit module may be configured to output RX data to either a start-of-packet (SOP) aligned system data interface or a custom streaming interface. A RX adaptor module may be used to adapt the data from the RX MAC circuit module to a format suitable for the SOP-aligned system data interface.

As further shown in FIG. 2, the IC 104 may also include a memory-mapped (MM) system management interface. The MM system management interface may be used to provide/receive control data to/from modules of the IC 104. In particular, the MM system management interface may provide/receive control data to/from the MAC circuit module and to/from an input/output module. The input/output module may be used to communicate control data to/from the optical module 102. The input/output module may be implemented, for example, using a management data input/output (MDIO) bus or an Inter IC (I2C) bus.

Aggregated PCS

Figure 3A:
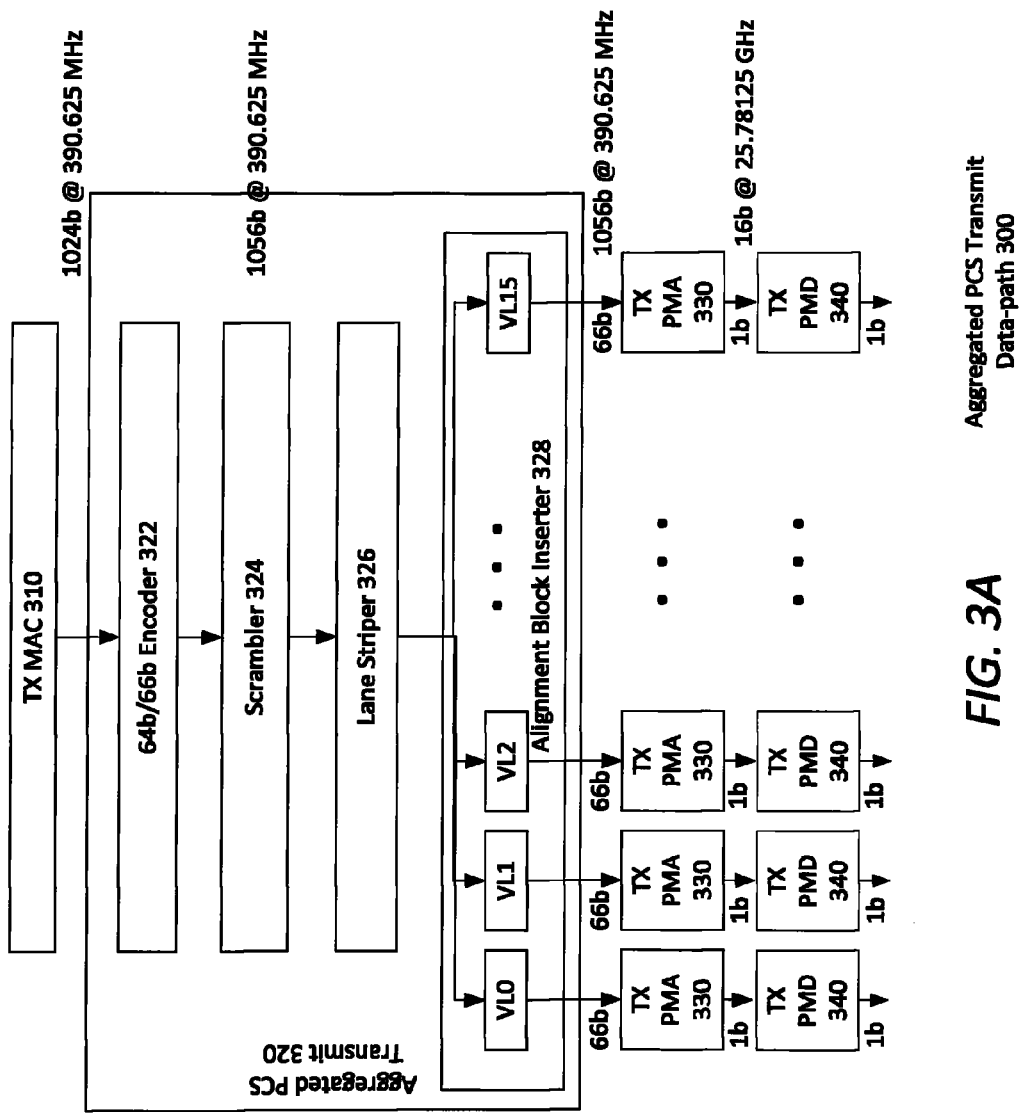
FIG. 3A depicts an exemplary transmit data-path with an aggregated PCS in accordance with a first embodiment of the invention.

FIG. 3A depicts an exemplary transmit data-path 300 with an aggregated PCS in accordance with a first embodiment of the invention. The TX data path 300 of FIG. 3A includes a virtual lane for each serial channel. In particular, as depicted, sixteen virtual lanes may be utilized for sixteen serial channels. As further depicted, the transmit data-path 300 may include a transmit media access control (TX MAC) circuit module 310, an aggregated physical coding sublayer transmit (PCS TX) circuit module 320, multiple transmit physical media access (TX PMA) circuit modules 330, and multiple transmit physical media dependent (TX PMD) circuit modules 340.

The aggregated PCS TX circuit module 320 may receive data to be transmitted from the TX MAC 310. In an exemplary implementation, the aggregated PCS TX 320 may receive sixteen 64-bit data words (input width of 1024 bits) at 390.625 MHz from the TX MAC 310. As depicted, the aggregated PCS TX 320 may include an encoder 322, a scrambler 324, a lane striper 326, and an alignment block inserter 328.

The encoder 322 may be used to increase state changes in the data for clock recovery and data alignment. In an exemplary implementation, the encoder 322 may receive 64-bit data words and perform 64 bit to 66 bit (64b/66b) encoding. In particular, the 64b/66b encoding may be performed on sixteen 64-bit data words (i.e. on a 1024-bit wide data input) at 390.625 MHz to generate sixteen 66-bit blocks (i.e. to generate a 1056-bit wide output) at 390.625 MHz.

The scrambler 324 may be a link-wide self-synchronizing scrambler. The scrambler may be link-wide in that it scrambles the data for the entire multi-channel link. The scrambler may be self-synchronizing in that it does not require any external mechanism to synchronize with the de-scrambler in the receiver. In an exemplary implementation, the scrambler 324 may have an input and an output that are 1056 bits wide and may operate at 390.625 MHz.

Figure 3B:
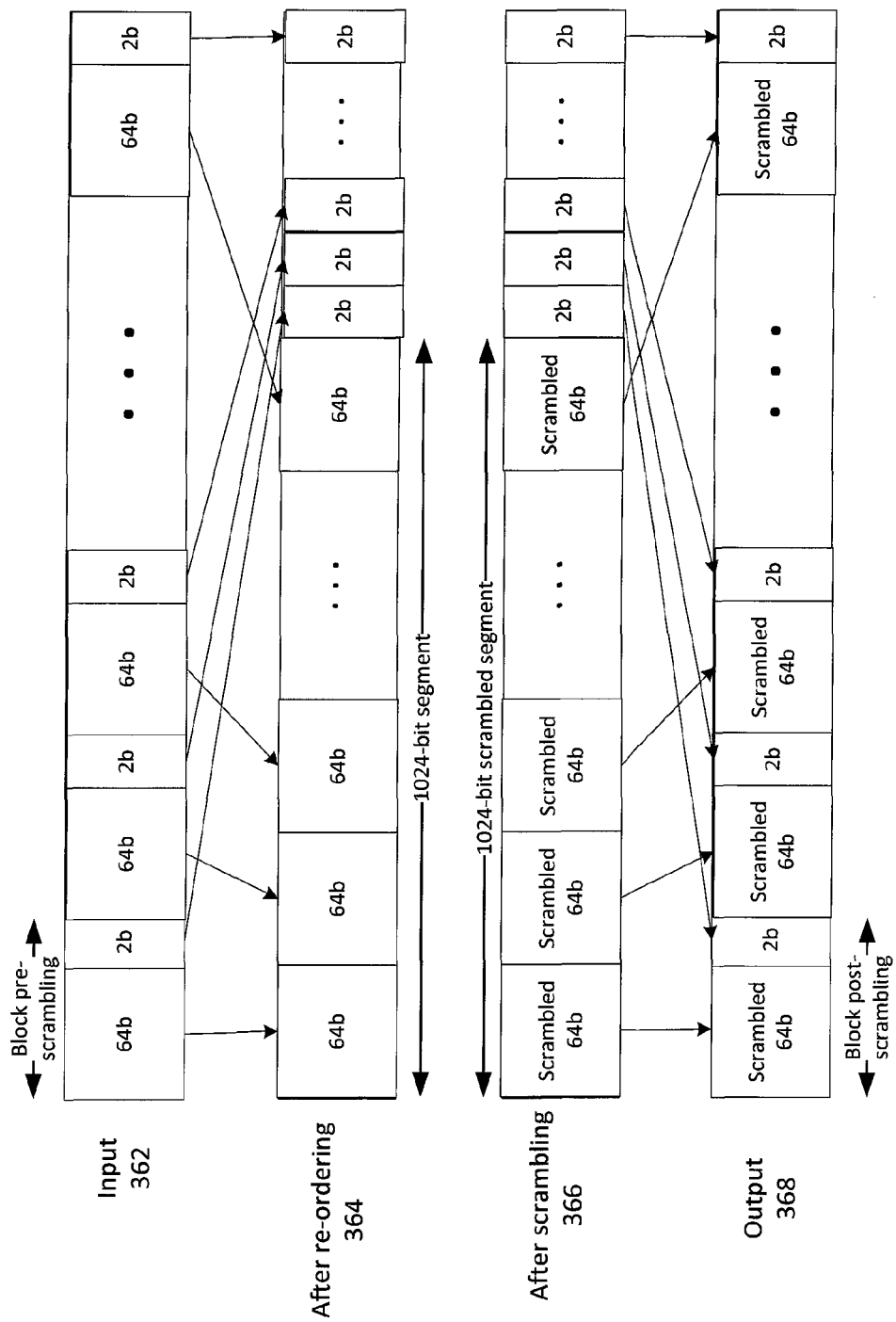
FIG. 3B depicts exemplary operations by a scrambler in accordance with the first embodiment of the invention.

The scrambler 324 need not necessarily scramble all the bits of each block. In the exemplary implementation depicted in FIG. 3B, the scrambler 324 may receive sixteen 66-bit blocks, including 64-bit and 2-bit portions of each block (see input 362 in FIG. 3B), re-order the portions so as to form a 1024-bit segment from the 64-bit portions (see structure after re-ordering 364 in FIG. 3B), scramble the bits in the 1024-bit segment (see structure after scrambling 366 in FIG. 3B), and output blocks including newly-formed 66-bit blocks (see output 368 in FIG. 3B). Each newly-formed 66-bit block that is output includes a 64-bit portion from the scrambled 1024-bit segment and a 2-bit portion of an original block.

The lane striper 326 may be used to stripe the blocks which include the scrambled data to multiple virtual lanes. In an exemplary implementation, the newly-formed 66-bit blocks may be striped to sixteen virtual lanes (VL0, VL1, VL2, ..., VL15).

The alignment block inserter 328 inserts alignment blocks into the blocks being transmitted in each of the virtual lanes. The alignment blocks are used to align the blocks being transmitted across the virtual lanes.

After the alignment block insertion, the aggregated PCS TX module 320 may map the multiple TX block streams from the multiple virtual lanes to multiple physical lanes. The mapping may involve re-ordering, and multiple lane gearboxing may be used.

In an exemplary implementation, the virtual lanes (VL) may be grouped into four sets (for example, VL0-VL3, VL4-VL7, VL8-VL11, and VL12-VL15) with four corresponding sets of physical lanes (PL) (for example, PL0-PL3, PL4-PL7, PL8-PL11, and PL12-PL15). Each set of VLs (and corresponding PLs) may be used to implement one 100 G link, two 50 G links, or four 25 G links. Two sets may be used together to implement one 200 G link, and all four sets may be used together to implement one 400 G link.

Each physical lane may include a TX PMA circuit module 330 and a corresponding TX PMD circuit module 340. In an exemplary implementation, each of sixteen TX block streams may be 66 bits wide such that the total output from the aggregated PCS TX module 320 is 1056 bits at 390.625 MHz.

The TX PMA circuit modules 330 serialize the TX block streams and output TX bit streams to the TX PMD circuit modules 340. The TX PMD circuit modules 340 may perform functionalities such as forward error correction (FEC) coding. The output TX bit streams from the TX PMD circuit modules 340 may be transmitted over the communication medium or media. In an exemplary implementation, each of sixteen output TX bit streams may operate at 25.78125 GHz and include FEC coding using a non-modulo 0 codeword length and a parallelism relationship.

Figure 4A:
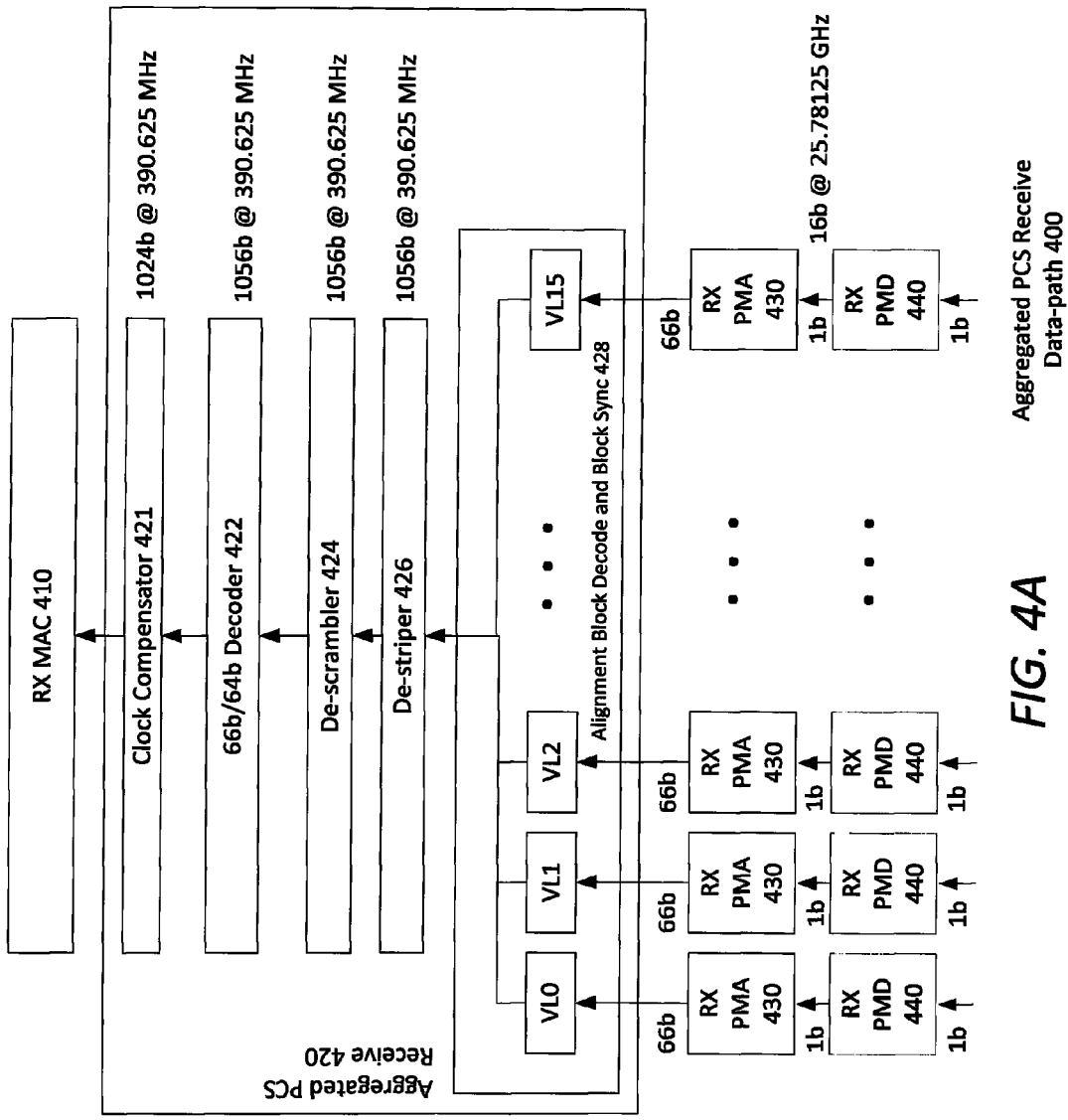
FIG. 4A depicts an exemplary receive data-path with an aggregated PCS in accordance with the first embodiment of the invention.

FIG. 4A depicts an exemplary receive data-path 400 with an aggregated PCS in accordance with the first embodiment of the invention. The RX data path 400 of FIG. 4A includes a virtual lane for each serial channel. In particular, as depicted, sixteen virtual lanes may be utilized for sixteen serial channels. As further depicted, the receive data-path 400 may include multiple receive physical media dependent (RX PMD) circuit modules 440, multiple receive physical media access (TX PMA) circuit modules 430, an aggregated physical coding sublayer receive (PCS RX) circuit module 420, and a receive media access control (RX MAC) circuit module 410. As further depicted, the aggregated PCS RX module 420 may include an alignment block decode and block synchronization circuit module 428, a de-striper 426, a descrambler 424, a decoder 422, and a clock compensator 421.

The multiple RX PMD circuit modules 440 may receive FEC-coded RX bit streams from the communication medium and may provide the RX bit streams after FEC decoding to the multiple RX PMA circuit modules 430. The RX PMA circuit modules 430 may de-serialize the RX bit streams and output RX block streams to the aggregated PCS RX circuit module 420. In an exemplary implementation, there are sixteen RX PMD and sixteen RX PMA circuit modules for sixteen virtual lanes (VL0, VL1, VL2, . . . VL15). In this implementation, each of the sixteen RX bit streams received by the PMA modules may be at 25.78125 GHz, and each of the sixteen RX block streams output by the PMA modules may be 66-bits wide at 390.625 MHz.

The multiple RX block streams may be received by the alignment block decode and block synchronization circuit module 428 of the aggregated PCS RX circuit module 420. The alignment block decode and block synchronization circuit module 428 decodes the alignment blocks in the RX blocks streams and uses the alignment blocks to synchronize the streams. In addition, the alignment block decode and block synchronization circuit module 428 may map the physical lanes to virtual lanes. This mapping may include re-ordering as may be necessary to reverse the mapping at the transmitter.

The de-striper circuit module 426 de-stripes the RX blocks from the virtual lanes. In an exemplary implementation, 66-bit blocks are de-striped from sixteen virtual lanes to generate a 1056-bit wide output at 390.625 MHz.

The de-scrambler 424 may be a link-wide self-synchronizing scrambler. The de-scrambler may be self-synchronizing in that it does not require any external mechanism to synchronize with the scrambler in the transmitter. The de-scrambler may be link-wide in that it de-scrambles the data for the entire multi-channel link. In an exemplary implementation, the de-scrambler 424 may have an input and an output that are 1056 bits wide and may operate at 390.625 MHz.

Figure 4B:
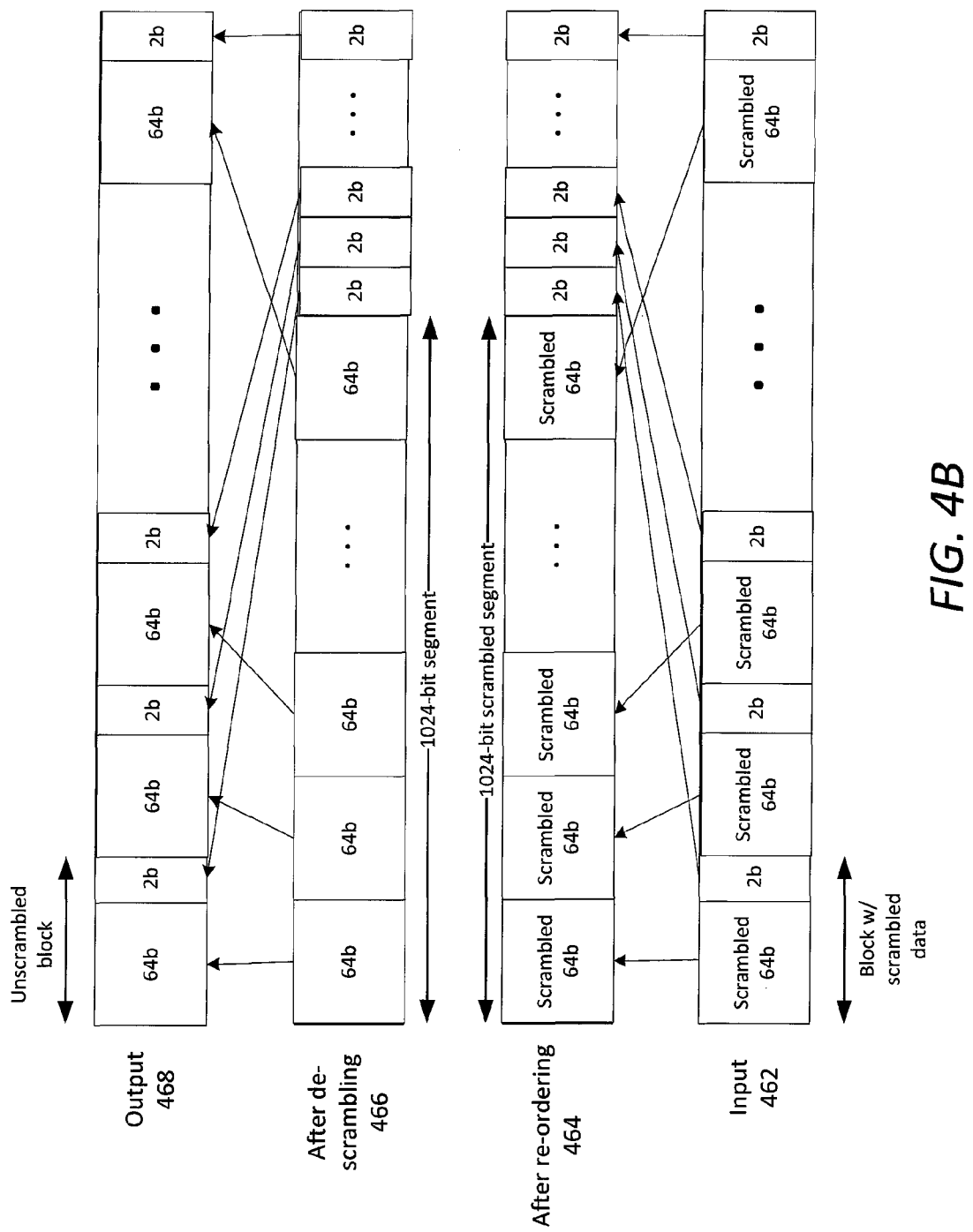
FIG. 4B depicts exemplary operations by a de-scrambler in accordance with the first embodiment of the invention.

The de-scrambler 424 need not necessarily de-scramble all the bits of each block. In the exemplary implementation depicted in FIG. 4B, the de-scrambler 424 may receive sixteen 66-bit blocks, including scrambled 64-bit and 2-bit portions of each block (see input 462 in FIG. 4B), re-order the portions so as to form a 1024-bit scrambled segment from the scrambled 64-bit portions (see structure after re-ordering 464 in FIG. 4B), de-scramble the bits in the 1024-bit scrambled segment (see structure after de-scrambling 466 in FIG. 4B) to regenerate a 1024-bit segment, and output blocks including regenerated 66-bit blocks (see output 468 in FIG. 4B). Each regenerated 66-bit block that is output includes a 64-bit portion from the 1024-bit segment (after de-scrambling) plus a 2-bit portion from a received block.

The decoder 422 reverses the encoding performed by the encoder 320 at the transmitter. In an exemplary implementation, the decoder 422 may perform 66 bit to 64 bit (66b/64b) decoding. In particular, the 66b/64b decoding may be performed on sixteen 66-bit blocks at 390.625 MHz to generate sixteen 64-bit data words at 390.625 MHz.

The clock compensator circuit module 421 may be used to compensate for a disparity in clock rates. The output of the clock compensator 421 may be provided to the RX MAC 410.

Aggregation Layer and Channel-Based PCS

Figure 5A:
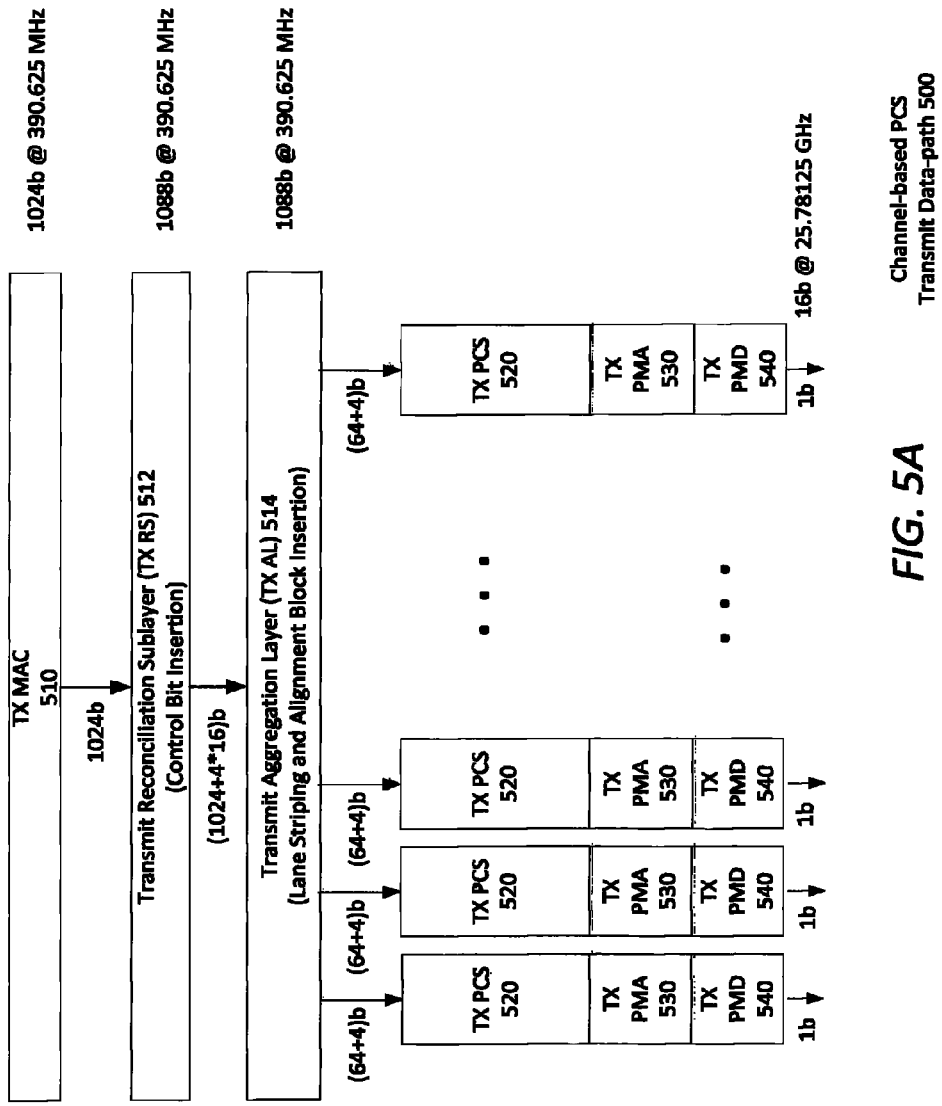
FIG. 5A depicts an exemplary transmit data-path with a channel-based PCS in accordance with a second embodiment of the invention.

FIG. 5A depicts an exemplary transmit data-path 500 with a channel-based PCS in accordance with a second embodiment of the invention. Note that the TX data-path 500 does not utilize virtual lanes and so does not require virtual lane reordering. As depicted, the transmit data-path 500 may include a TX MAC circuit module 510, a transmit reconciliation sublayer (TX RS) circuit module 512, a transmit aggregation layer (TX AL) circuit module 514, multiple TX PCS circuit modules 520, multiple TX PMA circuit modules 530, and multiple TX PMD circuit modules 540.

The TX RS circuit module 512 may receive data to be transmitted from the TX MAC circuit module 510 and generate control bits for the protocol stack. The TX RS circuit module 512 outputs blocks including the data and control bits to the AL circuit module 514. In an exemplary implementation, the TX RS circuit module 512 may receive sixteen 64-bit data words (input width of 1024 bits) at 390.625 MHz and generate four control bits per data word. In this case, the RS circuit module 512 may output sixteen 68-bit blocks (output width of 1088 bits) at 390.625 MHz.

The TX AL circuit module 514 may perform lane striping and alignment block insertion. The TX AL circuit module 514 may stripe the blocks into multiple physical lanes, each lane having corresponding TX PCS 520, TX PMA 530 and TX PMD 540 circuit modules. In the exemplary implementation, 68-bit blocks may be striped to sixteen physical lanes, each block including 64 data bits and 4 control bits. The TX AL circuit module 514 may also insert alignment blocks into the blocks being transmitted by each of the lanes. The alignment blocks are used to align the blocks being transmitted across the multiple lanes.

The TX PCS circuit module 520 provides a TX block stream to the corresponding TX PMA circuit module 530. In one implementation, the TX block stream may be 68 bits wide at 390.625 MHz, such that the total output from the sixteen TX PCS modules 520 is 1088 bits at 390.625 MHz (425 Gbps). An exemplary structure for the TX PCS circuit module 520 is described further below in relation to FIG. 5B.

The TX PMA circuit module 530 serializes the TX block stream and outputs a TX bit stream to the corresponding TX PMD circuit module 540. The TX PMD circuit modules 340 may perform functionalities such as forward error correction (FEC) coding. The output TX bit streams from the TX PMD circuit modules 340 may be transmitted over the communication medium or media. In an exemplary implementation, each of sixteen output TX bit streams may operate at 25.78125 GHz and include FEC coding using a non-modulo 0 codeword length and a parallelism relationship.

Figure 5B:
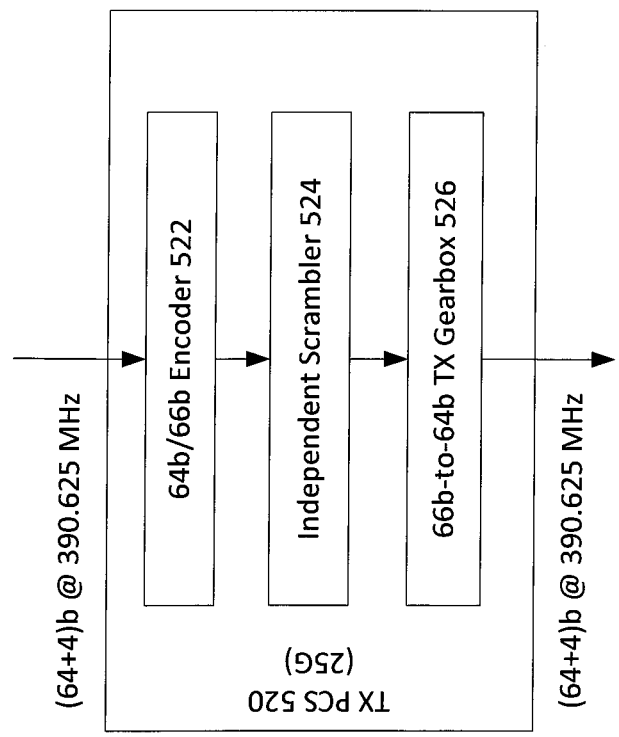
FIG. 5B depicts an exemplary transmit PCS circuit module for a channel in accordance with the second embodiment of the invention.

FIG. 5B depicts an exemplary transmit PCS circuit module 520 in accordance with the second embodiment of the invention. The TX PCS 520 may include an encoder circuit 522, a scrambler circuit 524, and a gearbox circuit 526. In an exemplary embodiment, the TX PCS 520 may have a data rate of 25 Gbps (25 G) with 68-bit wide input/output at 390.625 MHz.

The encoder circuit 522 may receive one lane of TX blocks (including data and control bits) from the TX AL 514. In an exemplary implementation, the width of the input may be 68 bits, including 64 data bits and 4 control bits. The encoder 522 may perform 64-bit to 66-bit encoding on the 64 data bits, for example, and output a width of 66 encoded data bits and 4 control bits to the scrambler circuit 524.

The scrambler circuit 524 may scramble bits of a segment of the data width. The scrambler circuit 524 may be independent in that the scrambling performed does not depend on the specific data sequences being scrambled. For example, the scrambler 524 may scramble a 64-bit segment of the 66 bits of encoded data.

The gearbox circuit 526 may be used to reduce the data width of the output of TX PCS 520. In an exemplary implementation, the gearbox circuit 526 may reduce the output data width of TX PCS 520 from 66 data bits to 64 data bits.

Figure 6A:
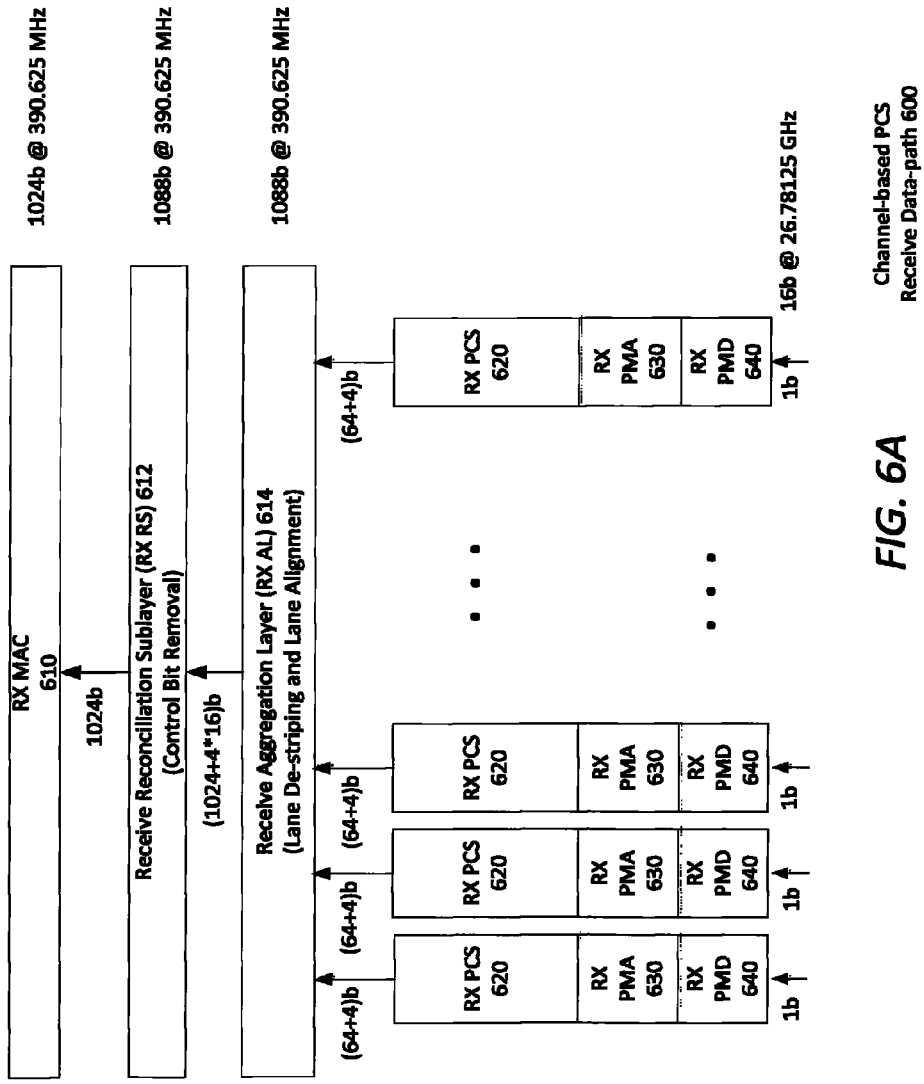
FIG. 6A depicts an exemplary receive data-path with a channel-based PCS in accordance with the second embodiment of the invention.

FIG. 6A depicts an exemplary receive data-path 600 with a channel-based PCS in accordance with the second embodiment of the invention. Note that the RX data-path 600 does not utilize virtual lanes and so does not require virtual lane reordering. As depicted, the receive data-path 600 may include multiple RX PMD circuit modules 640, multiple RX PMA circuit modules 630, multiple RX PCS circuit modules 620, a receive aggregation layer (RX AL) circuit module 614, a receive reconciliation sublayer (RX RS) circuit module 612, and a RX MAC circuit module 610.

The receive data-path 600 may include multiple physical lanes, each lane including its own RX PMD 640, RX PMA 630, and RX PCS 620 circuit modules. In an exemplary implementation, the receive data-path 600 may include sixteen physical lanes.

Each RX PMD circuit module 640 may receive an FEC-coded RX bit stream from the communication medium and may provide the RX bit stream after FEC decoding to the associated RX PMA circuit module 630. The RX PMA circuit module 630 may de-serialize the RX bit stream and output an RX block stream to the associated aggregated PCS RX circuit module 620. In an exemplary implementation, there are sixteen RX PMD and sixteen RX PMA circuit modules for sixteen RX lanes, where each of the sixteen RX bit streams received by the PMA modules may be at 25.78125 GHz, and each of the sixteen RX block streams output by the PMA modules may be 68-bits wide at 390.625 MHz.

Each RX PCS circuit module 620 may receive the RX block stream from the corresponding RX PMA circuit module 630. The output of each RX PCS 620 is provided to the RX AL 614. An exemplary structure for the RX PCS circuit module 620 is described further below in relation to FIG. 6B.

The RX AL circuit module 614 may perform lane alignment and lane de-striping. The RX AL 614 may decode and use alignment blocks in the RX block streams to align the lanes. The RX AL 614 may then de-stripe the RX blocks and provide then to the RX RS 612. In the exemplary implementation, 68-bit blocks may be de-striped from sixteen physical lanes, each block including 64 data bits and 4 control bits.

The RX RS 612 may receive the RX blocks from the RX AL 614 and remove the protocol-stack control bits from the RX blocks. This re-generates the data that was originally transmitted by the transmitter. The data is output from the RX RS circuit module 612 to the RS MAC circuit module 610. In an exemplary implementation, the RX RS 612 may receive sixteen 68-bit blocks (input width of 1088 bits) at 390.625 MHz and output sixteen 64-bit data words (output width of 1024 bits) at 390.625 MHz.

Figure 6B:
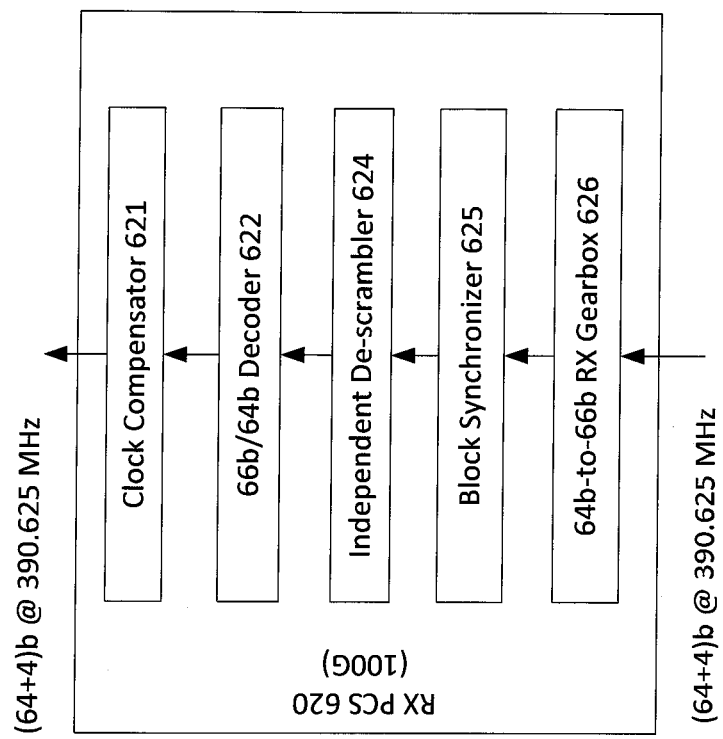
FIG. 6B depicts an exemplary receive PCS circuit module for a channel in accordance with the second embodiment of the invention.

FIG. 6B depicts an exemplary receive PCS circuit module 620 in accordance with the second embodiment of the invention. The RX PCS 620 may include a RX gearbox 626, a block synchronizer 625, a de-scrambler 624, a decoder 622, and a clock compensator 621. In an exemplary embodiment, the RX PCS 620 may have a data rate of 25 Gbps (25 G) with 68-bit wide input/output at 390.625 MHz.

The RX gearbox 626 may be used to increase the data width, effectively reversing the effect of the TX gearbox 526. In an exemplary implementation, the RX gearbox 626 may convert the data width from 64-bit width to a 66-bit width.

The block synchronizer 625 may decode alignment blocks in the RX block stream. The alignment blocks may be utilized by the block synchronizer 625 to ensure synchronization with the other lanes.

The de-scrambler 624 may de-scramble bits in the RX blocks. In an exemplary implementation, the de-scrambler 624 may de-scramble 64 bits out of every 66 encoded data bits to undo scrambling done at the transmitter.

The decoder 622 reverses the encoding performed by the encoder 520 at the transmitter. In an exemplary implementation, the decoder 622 may perform 66 bit-to-64 bit (66b/64b) decoding. In particular, the 66b/64b decoding may be performed on sixteen 66-bit blocks at 390.625 MHz to generate sixteen 64-bit data words at 390.625 MHz.

The clock compensator circuit module 621 may be used to compensate for a disparity in clock rates. The output of the clock compensator 621 may be provided to the RX MAC 610.

Aggregation Layer and Channel-Based PCS—Multiple Virtual Lanes Per Channel

Figure 7A:
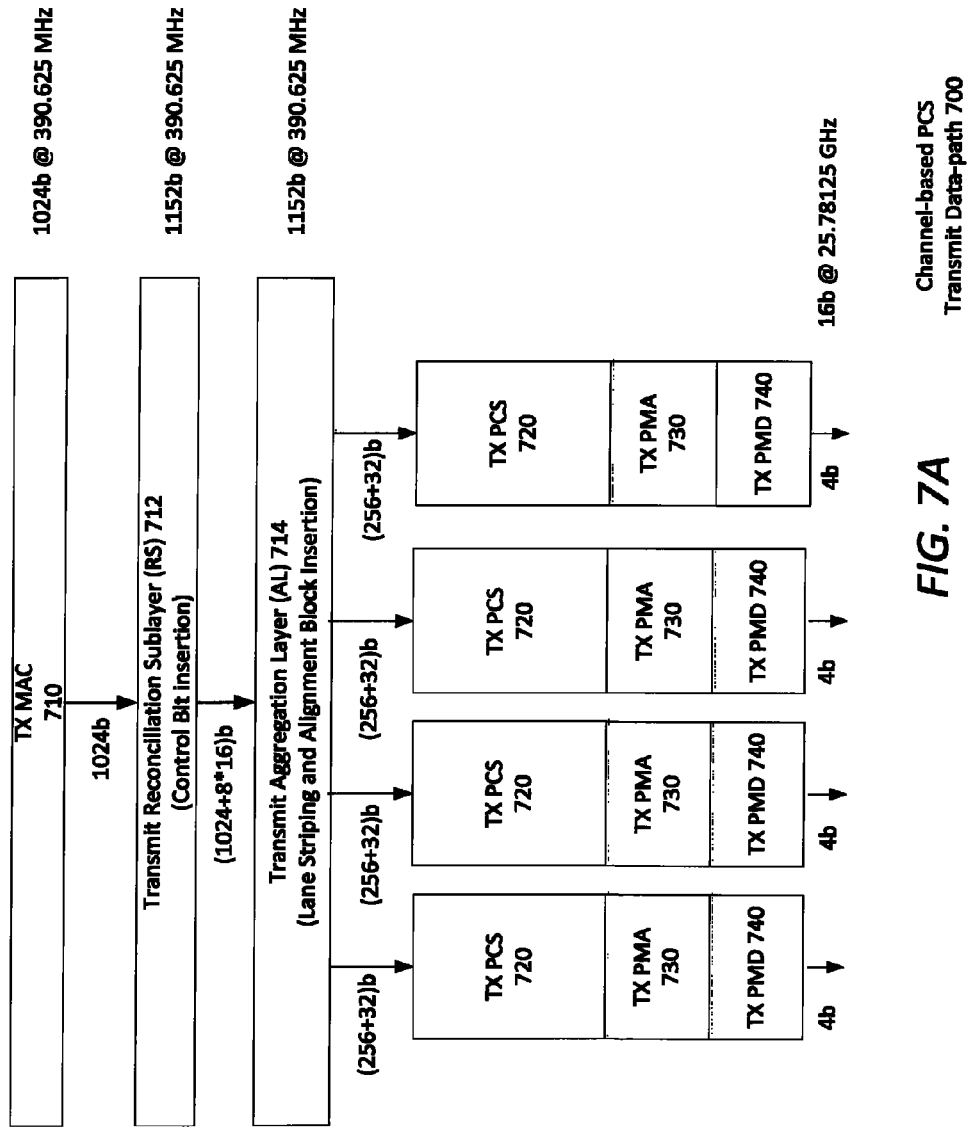
FIG. 7A depicts an exemplary transmit data-path with a channel-based PCS in accordance with a third embodiment of the invention.

FIG. 7A depicts an exemplary transmit data-path 700 with a channel-based PCS in accordance with a third embodiment of the invention. The TX data path 700 of FIG. 7A utilizes multiple virtual lanes within each channel and a second level of re-ordering of the channels. In comparison, the TX data path 300 of FIG. 3A utilizes a single virtual lane for each channel, and the TX data path 500 of FIG. 5A does not utilize virtual lanes. As depicted, the transmit data-path 700 may include a TX MAC circuit module 710, a transmit reconciliation sublayer (TX RS) circuit module 712, a transmit aggregation layer (TX AL) circuit module 714, multiple TX PCS circuit modules 720, multiple TX PMA circuit modules 730, and multiple TX PMD circuit modules 740.

The TX RS circuit module 712 may have a 1024-bit wide input comprising sixteen 64-bit data words from the TX MAC 710. The TX RS 712 may generate and output eight control bits for each of the sixteen 64-bit data words.

The TX AL circuit module 714 may have a 1152-bit input comprising 1024 data bits and 128 control bits. The TX AL 714 may output four high-speed channels. Each channel may have a width of 288 bits (256 data bits and 32 control bits).

The TX AL 714 may provide eighty virtual lanes, twenty per channel. A first level of ordering involves ordering the twenty virtual lanes within each channel. A second level of ordering involves re-ordering of the channels (i.e. changing the correspondence between the channels and the TX PCS 720).

Each high-speed channel has corresponding to it a TX PCS circuit module 720, a TX PMA circuit module 730, and a TX PMD circuit module 740. Each of the four TX PMD circuit modules 740 may have a four-bit-wide output at 25.78125 GHz for a total width of 16 bits and a total data rate of 103.125 Gbps. In one implementation, the TX PMD circuit modules 740 may output data that is FEC-coded utilizing the FEC coding under IEEE 802.3bj.

Figure 7B:
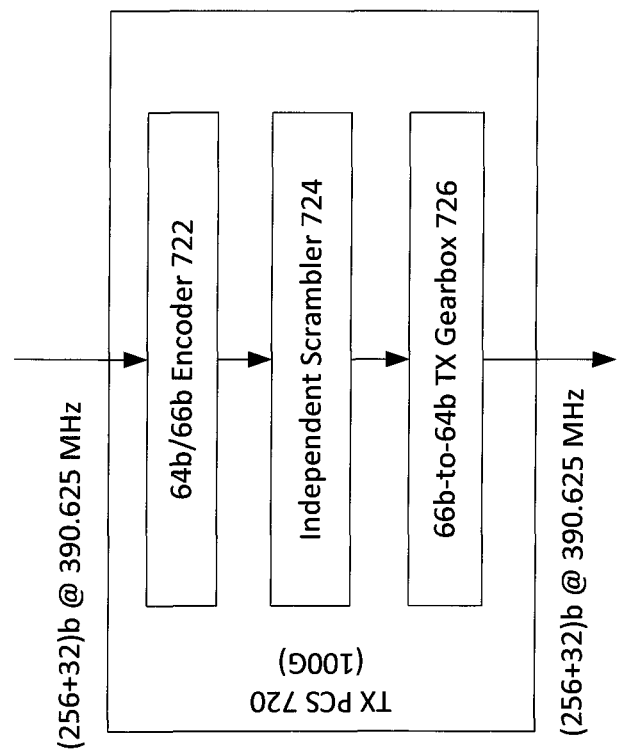
FIG. 7B depicts an exemplary transmit PCS circuit module for a channel in accordance with the third embodiment of the invention.

FIG. 7B depicts an exemplary transmit PCS circuit module 720 for a channel in accordance with the third embodiment of the invention. The TX PCS 720 may include an encoder circuit 722, a scrambler circuit 724, and a gearbox circuit 726. In an exemplary embodiment, the TX PCS 720 may have a data rate of 103.125 Gbps (100 G) with 288-bit wide input/output at 390.625 MHz.

The encoder circuit 722 may receive one channel of TX blocks (including data and control bits) from the TX AL 714. In an exemplary implementation, the width of the input may be 288 bits, including 256 data bits and 32 control bits. The encoder 722 may perform 64-bit to 66-bit encoding on the 256 data bits, for example, and output a width of 264 encoded data bits and 32 control bits to the scrambler circuit 724.

The scrambler circuit 724 may scramble bits of a segment of the data width. The scrambler circuit 724 may be independent in that the scrambling performed does not depend on the specific data sequences being scrambled. For example, the scrambler 724 may scramble a 256-bit segment of the 264 bits of encoded data.

The gearbox circuit 726 may be used to reduce the data width of the output of TX PCS 720. In an exemplary implementation, the gearbox circuit 726 may reduce the output data width of TX PCS 720 from 264 data bits to 256 data bits.

Figure 8A:
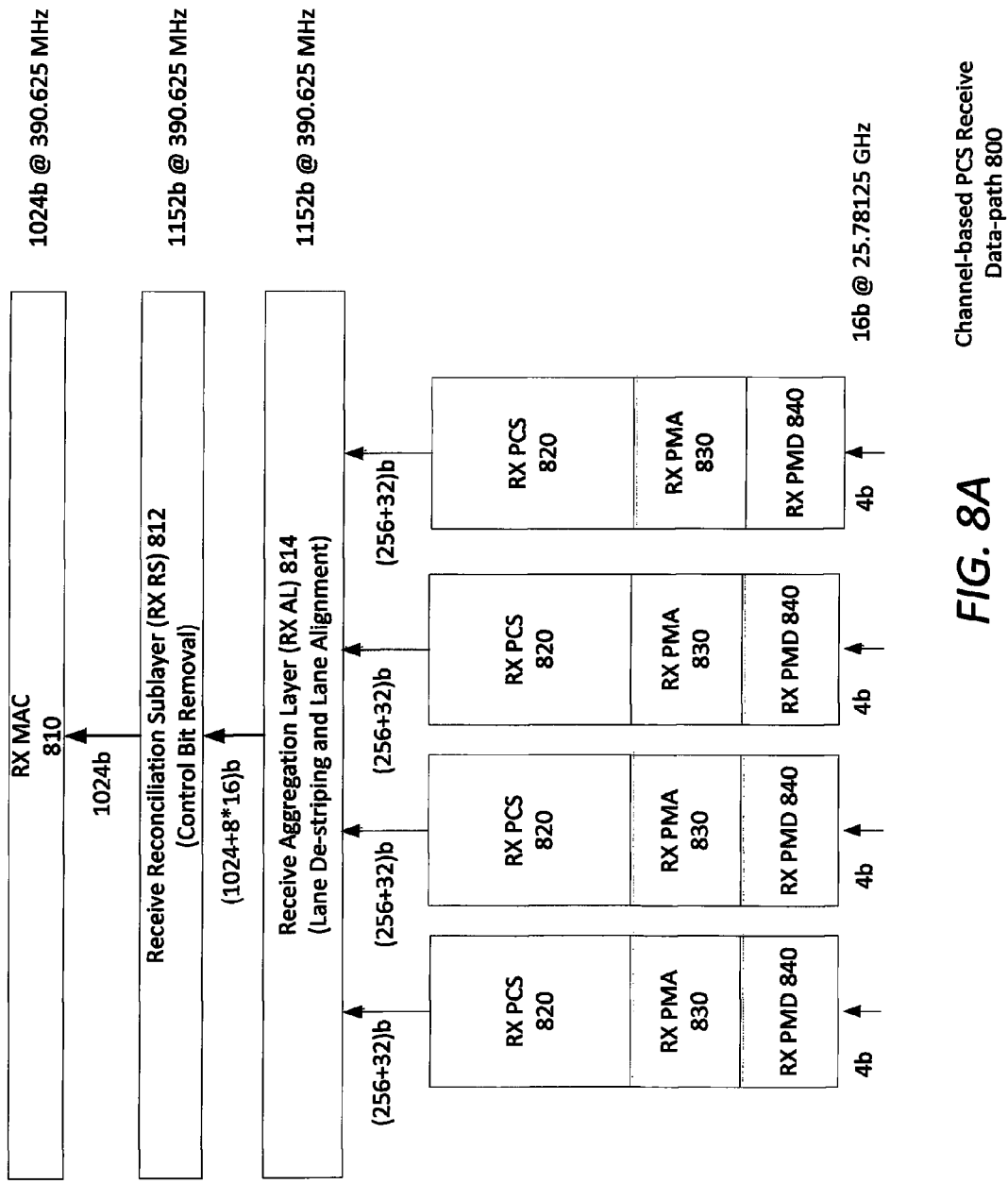
FIG. 8A depicts an exemplary receive data-path with a channel-based PCS in accordance with the third embodiment of the invention.

FIG. 8A depicts an exemplary receive data-path 800 with a channel-based PCS in accordance with the third embodiment of the invention. The RX data path 800 of FIG. 8A utilizes multiple virtual lanes within each channel and a second level of re-ordering of the channels. In comparison, the RX data path 400 of FIG. 4A utilizes a single virtual lane for each channel, and the RX data path 600 of FIG. 6A does not utilize virtual lanes. As depicted, the receive data-path 800 may include a RX MAC circuit module 810, a receive reconciliation sublayer (RX RS) circuit module 812, a receive aggregation layer (RX AL) circuit module 814, multiple RX PCS circuit modules 820, multiple RX PMA circuit modules 830, and multiple RX PMD circuit modules 840.

Each channel of four channels has corresponding to it a RX PMD circuit module 840, a RX PMA circuit module 830, and a RX PCS circuit module 820. Each of the four RX PMD circuit modules 840 may have a four-bit-wide input at 25.78125 GHz for a total width of 16 bits and a total data rate of 103.125 Gbps. Each RX PMD 840 may receive FEC-coded data and output the data after FEC decoding. Each of the four RX PCS circuit modules 820 may have a 288-bit wide (256 data bits and 32 control bits) output at 390.625 MHz.

The RX AL circuit module 814 may have a 1152-bit wide input at 390.625 MHz to receive the four 288-bit wide channels from the four RX PCS modules 820. The RX AL 814 may perform lane alignment (using alignment blocks) and lane de-striping. The lane de-striping may de-stripe the data from each channel into twenty virtual lanes.

The RX RS circuit module 812 may remove the control bits. In an exemplary implementation, the RX RS circuit module 812 may have an input that is 1152 bits wide from the RX AL 814 and an output that is 1024 bits wide to the RX MAC 810.

Figure 8B:
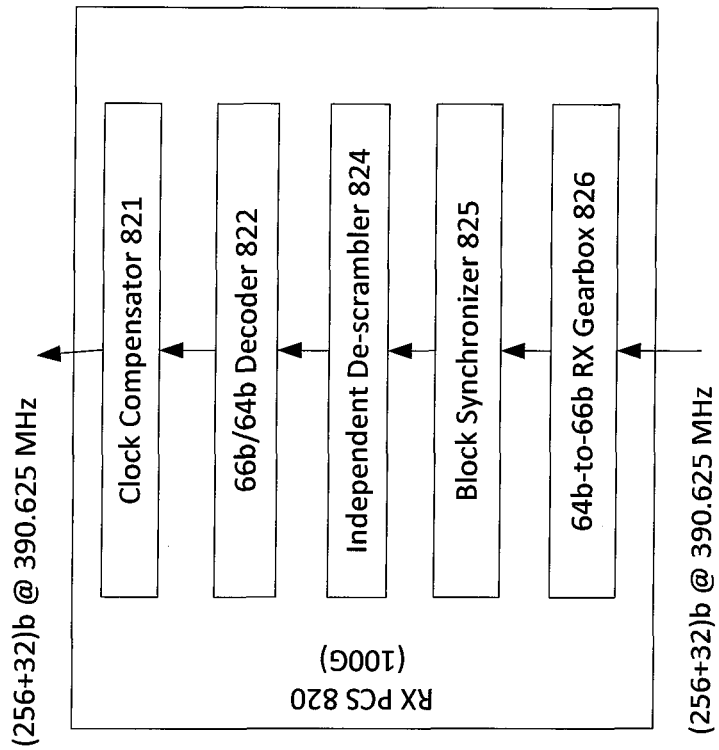
FIG. 8B depicts an exemplary receive PCS circuit module for a channel in accordance with the third embodiment of the invention.

FIG. 8B depicts an exemplary receive PCS circuit module 820 for a channel in accordance with the third embodiment of the invention. The RX PCS 820 may include a RX gearbox 826, a block synchronizer 825, a de-scrambler 824, a decoder 822, and a clock compensator 821. In an exemplary embodiment, the RX PCS 820 may have a data rate of 103.125 Gbps (100 G) with 288-bit wide input/output at 390.625 MHz.

The RX gearbox 826 may be used to increase the data width, effectively reversing the effect of the TX gearbox 726. In an exemplary implementation, the RX gearbox 826 may convert the data width from 64-bit width to a 66-bit width.

The block synchronizer 825 may decode alignment blocks in the RX block stream. The alignment blocks may be utilized by the block synchronizer 825 to ensure synchronization with the other lanes.

The de-scrambler 824 may de-scramble bits in the RX blocks. In an exemplary implementation, the de-scrambler 824 may de-scramble 64 bits out of every 66 encoded data bits to undo scrambling done at the transmitter.

The decoder 822 reverses the encoding performed by the encoder 720 at the transmitter. In an exemplary implementation, the decoder 822 may perform 66 bit to 64 bit (66b/64b) decoding. In particular, the 66b/64b decoding may be performed on the 256 data bits at 390.625 MHz to generate sixteen 64-bit data words at 390.625 MHz., for example, and output a width of 264 encoded data bits and 32 control bits to the scrambler circuit 724.

The clock compensator circuit module 821 may be used to compensate for a disparity in clock rates. The output of the clock compensator 821 may be provided to the RX MAC 810.

Figure 9:
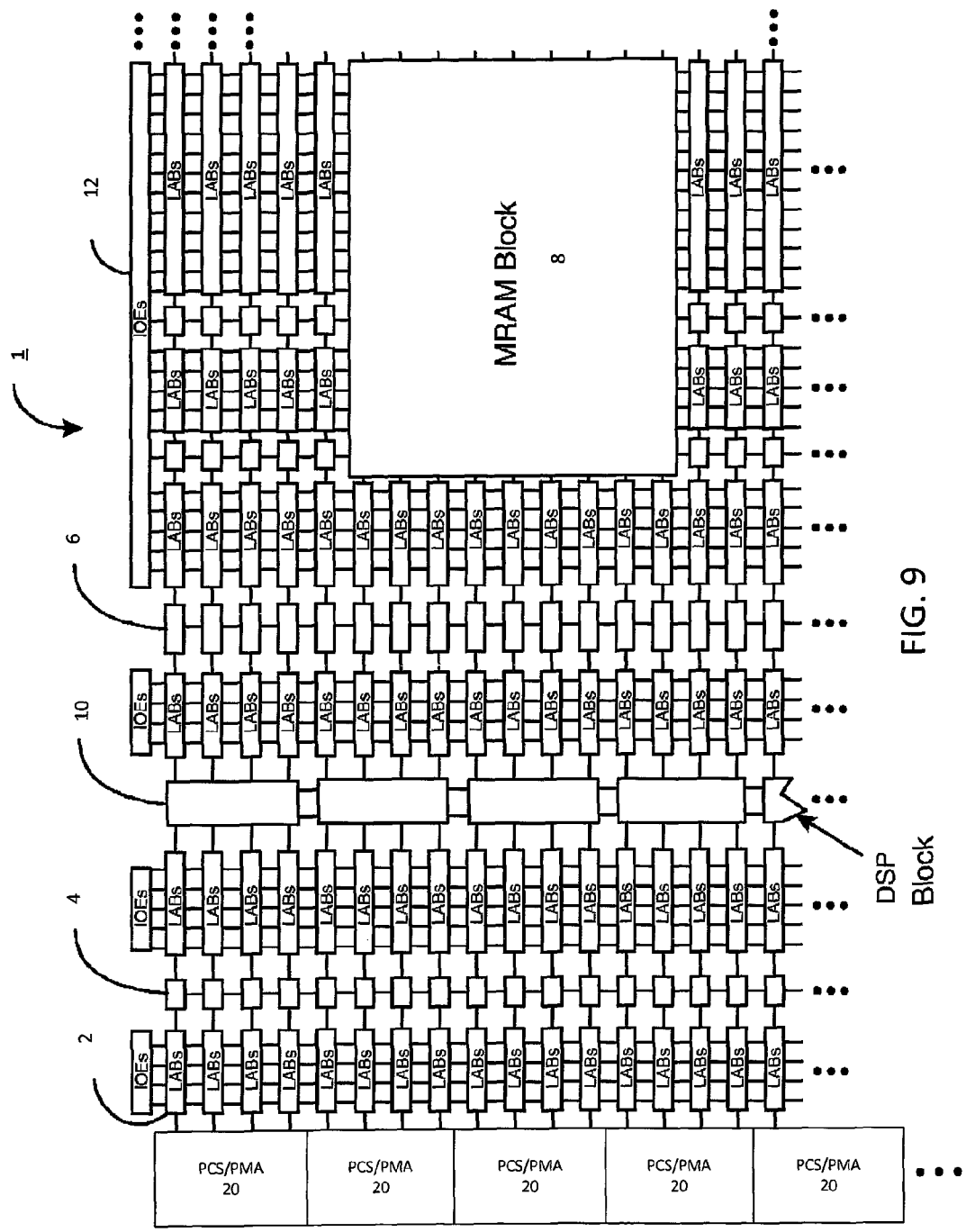
FIG. 9 is a simplified partial block diagram of a field programmable gate array (FPGA) that can include aspects of the present invention.

FIG. 9 is a simplified partial block diagram of a field programmable gate array (FPGA) 10 that can include aspects of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (i.e., a pin) of FPGA 10. A transceiver (TX/RX) channel array may be arranged as shown, for example, with each TX/RX channel circuit 30 being coupled to several LABs. A TX/RX channel circuit 30 may include, among other circuitry, the transmitter and/or receiver circuitry described herein.

It is to be understood that FPGA 10 is described herein for illustrative purposes only and that the present invention can be implemented in many different types of PLDs, FPGAs, and ASICs.

Figure 10:
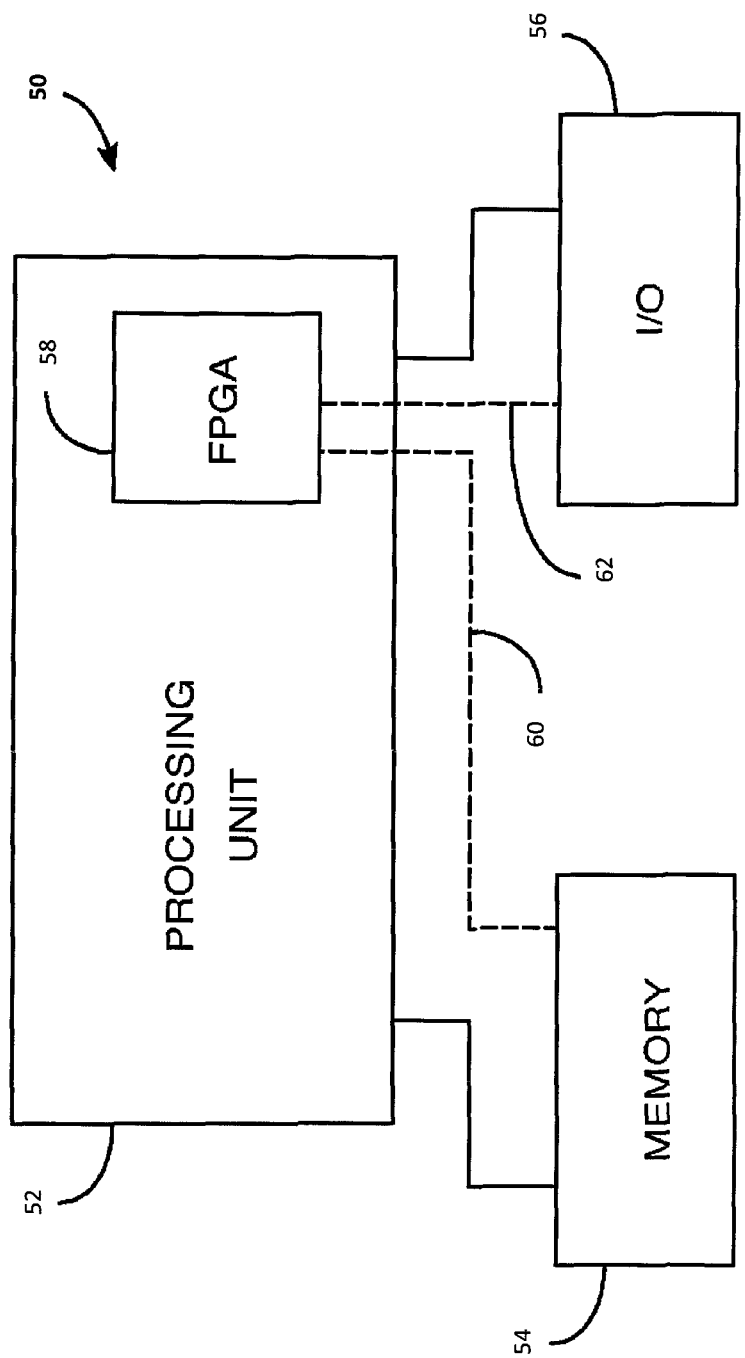
FIG. 10 is a block diagram of an exemplary digital system that can employ techniques of the present invention.

FIG. 10 shows a block diagram of an exemplary digital system 50 that can embody techniques of the present invention. System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. An integrated circuit including circuitry for data communications, the integrated circuit comprising:
    an aggregated multiple-virtual-lane physical coding sublayer circuit module that receives a plurality of transmit data words of a first size, the aggregated multiple-virtual-lane physical coding sublayer circuit module comprising
        an encoder for encoding the plurality of transmit data words to generate an encoder output comprising a plurality of transmit blocks of a second size, the second size having a greater number of bits than the first size,
        a scrambler that operates to
            re-order bits within the encoder output so as to form a first segment from first portions of the plurality of transmit blocks and a second segment from second portions of the plurality of transmit blocks, wherein the first portions are of the first size,
            scramble bits within the first segment to form a scrambled segment while not scrambling bits within the second segment,
            divide the scrambled segment to form a plurality of scrambled portions of the first size, and
            form a scrambler output comprising a plurality of scrambled transmit blocks, each said scrambled transmit block comprising one scrambled portion and one second portion;
        a lane striper that receives the scrambler output directly from the scrambler and stripes the plurality of scrambled transmit blocks to a plurality of transmit virtual lanes so as to generate a plurality of transmit block streams corresponding to the plurality of transmit virtual lanes, and
        an alignment block inserter for inserting alignment blocks into the plurality of transmit block streams.

2. The integrated circuit of claim 1, wherein the scrambler comprises a link-wide scrambler generates the plurality of scrambled transmit blocks self-synchronously.

3. The integrated circuit of claim 1 further comprising:
    a media access control circuit module which provides the plurality of transmit data words to the aggregated multiple-virtual-lane physical coding sublayer; and
    a plurality of physical media access circuit modules, each physical media access circuit module serializing one of the plurality of transmit block streams to generate one of a plurality of transmit bit streams.

4. The integrated circuit of claim 3, wherein the plurality of transmit data words each includes sixty-four bits, and the blocks each include sixty-six bits, and
    wherein the plurality of transmit virtual lanes comprises sixteen virtual lanes, and wherein each physical media access circuit module operates at a data rate of at least 25 gigabits per second.

5. The integrated circuit of claim 3, wherein the plurality of physical media access circuit modules receive a plurality of receive bit streams for a plurality of receive lanes and de-serialize the plurality of receive bit streams to generate a plurality of receive block streams.

6. The integrated circuit of claim 5, wherein the aggregated multiple-virtual-lane physical coding sublayer circuit module further comprises
    an alignment block decoder and block synchronizer circuit module for decoding the alignment blocks in the plurality of receive block streams and using the alignment blocks to synchronize the plurality of receive lanes and obtain a plurality of aligned receive blocks,
    a lane de-striper for re-ordering and de-striping the plurality of aligned receive blocks from the plurality of receive lanes,
    a de-scrambler for de-scrambling at least a portion of bits in each block of the plurality of aligned receive blocks to generate a plurality of de-scrambled receive blocks, and
    a decoder for decoding the plurality of de-scrambled receive blocks to generate a plurality of receive data words and providing the plurality of receive data words to the media access control module, wherein each receive data word has a same number of bits as each transmit data word.

7. The integrated circuit of claim 6, wherein the transmit and receive data words each includes sixty-four bits, and the blocks each include sixty-six bits.

8. The integrated circuit of claim 6, wherein the de-scrambler comprises a link-wide de-scrambler.

9. The integrated circuit of claim 6, wherein the plurality of receive virtual lanes comprises sixteen virtual lanes, and wherein each physical media access circuit module operates at a data rate of at least 25 gigabits per second.

10. The integrated circuit of claim 1, wherein the aggregated multiple-virtual-lane physical coding sublayer circuit module is implemented in programmable logic circuitry of the integrated circuit, and wherein the plurality of physical media access circuit modules are implemented in hard-wired circuitry of the integrated circuit.

11. An integrated circuit including circuitry for data communications, the integrated circuit comprising:
    an aggregation layer circuit module for lane striping and alignment block insertion, wherein the lane striping comprises striping a plurality of transmit blocks to a plurality of transmit lanes so as to provide a plurality of transmit block streams to the plurality of transmit lanes, and wherein the alignment block insertion comprises insertion of alignment blocks into the plurality of transmit block streams; and a plurality of channel-based physical coding sublayer circuit modules receiving the plurality of transmit block streams, wherein each channel-based physical coding sublayer circuit module includes
   an encoder for encoding a transmit block stream of the plurality of transmit block streams to generate an encoded transmit block stream, wherein the encoded transmit block stream has a greater width in bits than the transmit block stream,
   an independent scrambler for scrambling at least a portion of bits in each encoded transmit block stream to generate a scrambled transmit block stream, and
   a gearbox for reducing a width of the scrambled transmit block stream to generate one of a plurality of reduced-width transmit block streams.

12. The integrated circuit of claim 11, further comprising:
a plurality of physical media access circuit modules, each physical media access circuit module serializing one of the plurality of reduced-width transmit block streams to generate one of a plurality of transmit bit streams.

13. The integrated circuit of claim 11,
wherein each data word of the plurality of transmit data words includes sixty-four bits, and each block of the plurality of transmit blocks includes sixty-eight bits,
wherein the plurality of channel-based physical coding sublayer circuit modules comprises sixteen physical coding sublayer circuit modules, and
wherein each physical media access circuit module operates at a data rate of at least 25 gigabits per second.

14. The integrated circuit of claim 11, wherein each channel-based physical coding sublayer circuit module provides a plurality of virtual lanes that are re-ordered by the aggregation layer circuit module.

15. The integrated circuit of claim 14,
wherein each data word of the plurality of transmit data words includes sixty-four bits, and each block of the plurality of transmit blocks includes seventy-two bits,
wherein the plurality of channel-based physical coding sublayer circuit modules comprises four physical coding sublayer circuit modules that each provide twenty virtual lanes, and
wherein each physical media access circuit module operates at a data rate of at least 100 gigabits per second.

16. The integrated circuit of claim 11, wherein the plurality of physical media access circuit modules de-serialize a plurality of receive bit streams to generate a plurality of receive block streams, and wherein the plurality of channel-based physical coding sublayer circuit modules each performs block synchronization, de-scrambling, decoding, and clock compensation on one of the plurality of receive block streams.

17. The integrated circuit of claim 16, wherein the aggregation layer circuit module receives the plurality of receive block streams and performs lane alignment and lane de-striping.

18. The integrated circuit of claim 11, wherein the reconciliation layer and aggregation layer circuit modules are implemented in programmable logic circuitry of the integrated circuit, and wherein the plurality of physical coding sublayer circuit modules and the plurality of physical media access circuit modules are implemented in hard-wired circuitry of the integrated circuit.

19. A method of data communications using an aggregated physical coding sublayer circuit module, the method comprising:
scrambling a portion of bits in each of a plurality of transmit blocks by a scrambler circuit in the aggregated physical coding sublayer circuit module to generate a plurality of scrambled transmit blocks, wherein the scrambling includes
re-ordering bits so as to form a first segment from first portions of the plurality of transmit blocks and a second segment from second portions of the plurality of transmit blocks, wherein the first portions are of a first size,
scrambling bits within the first segment to form a scrambled segment while not scrambling bits within the second segment,
dividing the scrambled segment to form a plurality of scrambled portions of the first size, and
forming a plurality of scrambled transmit blocks, each said scrambled transmit block comprising one scrambled portion and one second portion;
receiving the plurality of scrambled transmit blocks by a striper circuit directly from the scrambler circuit;
striping the plurality of scrambled transmit blocks to a plurality of transmit virtual lanes by the lane striper circuit in the aggregated physical coding sublayer circuit module to generate a plurality of transmit block streams corresponding to the plurality of transmit virtual lanes;
inserting alignment blocks into the plurality of transmit block streams by the aggregated physical coding sublayer circuit module; and
serializing the plurality of transmit block streams to generate a plurality of transmit bit streams.

20. The method of claim 19 further comprising:
receiving a plurality of receive bit streams for a plurality of receive lanes;
de-serializing the plurality of receive bit streams to generate a plurality of receive block streams;
decoding the alignment blocks in the plurality of receive block streams;
using the alignment blocks by the aggregated physical coding sublayer circuit module to synchronize the plurality of receive lanes and obtain a plurality of aligned receive blocks;
re-ordering and de-striping the plurality of aligned receive blocks from the plurality of receive lanes by the aggregated physical coding sublayer circuit module;
de-scrambling at least a portion of bits in each block of the plurality of aligned receive blocks by the aggregated physical coding sublayer circuit module to generate a plurality of de-scrambled receive blocks;
decoding the plurality of de-scrambled receive blocks by the aggregated physical coding sublayer circuit module to generate a plurality of receive data words; and
outputting the plurality of receive data words by the aggregated physical coding sublayer circuit module.

21. A method of data communications using an aggregation layer circuit module and a plurality of channel-based physical coding sublayer circuit modules, the method comprising:
striping a plurality of transmit blocks to a plurality of transmit lanes by the aggregation layer circuit module so as to provide a plurality of transmit block streams to the plurality of transmit lanes;
inserting alignment blocks into the plurality of transmit block streams by the aggregation layer circuit module;
encoding a transmit block stream of the plurality of transmit block streams by each of the plurality of channel-based physical coding sublayer circuit modules to generate an encoded transmit block stream having a greater width in bits than the transmit block stream;

scrambling at least a portion of bits in the encoded transmit block stream by an independent scrambler within each of the plurality of channel-based physical coding sublayer circuit modules to generate a scrambled transmit block stream;

reducing a width of the scrambled transmit block stream by each of the plurality of channel-based physical coding sublayer circuit modules to generate a reduced-width transmit block stream; and serializing the plurality of reduced-width transmit block streams to generate a plurality of transmit bit streams.

22. The method of claim 21, wherein each data word of the plurality of transmit data words includes sixty-four bits, and each block of the plurality of transmit blocks includes sixty-eight bits, wherein the plurality of channel-based physical coding sublayer circuit modules comprises sixteen physical coding sublayer circuit modules, and wherein each physical media access circuit module operates at a data rate of at least 25 gigabits per second.

23. The method of claim 21 further comprising:

providing a plurality of virtual lanes by each channel-based physical coding sublayer circuit module; and re-ordering the virtual lanes by the aggregation layer circuit module.

24. The method of claim 23, wherein each data word of the plurality of transmit data words includes sixty-four bits, and each block of the plurality of transmit blocks includes seventy-two bits, wherein the plurality of channel-based physical coding sublayer circuit modules comprises four physical coding sublayer circuit modules each providing twenty virtual lanes, and wherein each physical media access circuit module operates at a data rate of at least 100 gigabits per second.

\* \* \* \* \*